United States Patent [19]
Hutchison

[11] Patent Number: 5,199,314
[45] Date of Patent: Apr. 6, 1993

[54] SYNCHRONIZED SPLITTER SECTION PROTECTION SYSTEM/METHOD

[75] Inventor: Ronald A. Hutchison, Portage, Mich.

[73] Assignee: Eaton Corporation, Cleveland, Ohio

[21] Appl. No.: 824,956

[22] Filed: Jan. 23, 1992

[51] Int. Cl.⁵ .............................................. F16H 59/00
[52] U.S. Cl. ................................ 74/335; 74/336 R
[58] Field of Search ...................... 74/335, 336, 336 R

[56] References Cited

U.S. PATENT DOCUMENTS

| | | | |
|---|---|---|---|
| 3,229,551 | 1/1966 | Stuckey | 74/745 |
| 3,530,668 | 9/1970 | Siebers et al. | 74/336 X |
| 3,939,722 | 2/1976 | Stromberg | 74/336 B |
| 4,296,642 | 10/1981 | Schetter | 74/475 |
| 4,428,469 | 1/1984 | Morscheck et al. | 192/53 E |
| 4,450,869 | 5/1984 | Acker | 137/625.48 |
| 4,690,008 | 9/1987 | Klatt | 74/336 |
| 4,754,665 | 7/1988 | Vandervoort | 74/745 |
| 4,788,875 | 12/1988 | Genise | 74/335 X |
| 4,793,378 | 12/1988 | Loeffler et al. | 137/560 |
| 4,920,815 | 5/1990 | Reynolds | 74/335 |
| 4,944,197 | 7/1990 | Stine et al. | 74/477 |
| 4,974,474 | 12/1990 | Newbigging | 74/335 X |
| 4,989,706 | 2/1991 | Morscheck | 192/53 E |
| 4,998,443 | 3/1991 | Janiszewski | 74/335 |
| 5,092,187 | 3/1992 | Irwin | 74/335 |

*Primary Examiner*—Leslie A. Braun
*Assistant Examiner*—Daniel Wittels
*Attorney, Agent, or Firm*—H. D. Gordon

[57] ABSTRACT

Shift control system (300)/method for a splitter type auxiliary section (14/102) is provided which includes control members (328) to prevent auxiliary section synchronized clutch (92, 136) damage if the master clutch (C) is engaged during an auxiliary section shift. Upon sensing master clutch engagement during a shift into the auxiliary section high-speed ratio, the force is used to engage the high speed ratio is reduced from a first ($p^*a_{224}$) to a considerably lower second ($p^*a_{224}-a_{222}$)) level.

55 Claims, 7 Drawing Sheets

SYNCHRONIZED SPLITTER SECTION PROTECTION SYSTEM/METHOD

BACKGROUND OF THE INVENTION

Related Applications

This application is related to copending U.S. patent applications:

Ser. No. 824,925, entitled RANGE SECTION PROTECTION VALVE ASSEMBLY;

Ser. No. 824,924, entitled AUXILIARY SECTION ACTUATOR CONTROL SYSTEM AND METHOD;

Ser. No. 824,673, entitled INTERLOCK MECHANISM FOR RANGE SECTION SLAVE VALVE;

Ser. No. 824,675, entitled RANGE VALVE PRE-EXHAUST;

Ser. No. 824,961, entitled TWO-STAGE RANGE PISTON/CYLINDER ASSEMBLY;

Ser. No. 824,645, entitled VARIABLE PRESSURE RANGE SECTION ACTUATOR PISTON;

Ser. No. 824,960, entitled DUAL PRESSURE REGULATOR;

Ser. No. 824,672, entitled VARIABLE PRESSURE RANGE SECTION ACTUATOR ASSEMBLY;

Ser. No. 824,957, entitled AUXILIARY SECTION ACTUATOR AIR CONTROL SYSTEM;

Ser. No. 824,638, entitled RANGE SECTION ACTUATOR CONTROL SYSTEM AND METHOD FOR PREVENTING DAMAGE TO RANGE SECTION SYNCHRONIZERS; and all assigned to the same assignee, Eaton Corporation, and filed the same day, Jan. 23, 1992, as this application.

1. Field of the Invention

The present invention relates to a control system or method for controlling the auxiliary section actuator of a vehicular compound transmission. In particular, the present invention relates to a control system or method for protecting the auxiliary section synchronized splitter jaw clutches, especially the splitter section high speed synchronized jaw clutches, of a compound heavy duty vehicular transmission.

2. Description of the Prior Art

Compound change gear transmissions of the type having one or more auxiliary sections connected in series with a main transmission section are very well known in the prior art. Such transmissions are typically associated with heavy duty vehicles such as large trucks, tractor/semi-trailers, and the like. Briefly, by utilizing main and auxiliary transmission sections connected in series, assuming proper relative sizing of the ratio steps, the total of available transmission ratios is equal to the product of the main and auxiliary section ratios. By way of example, at least in theory, a compound change gear transmission comprising a four (4) speed main section connected in series with a four (4) speed auxiliary section will provide sixteen (4×4=16) available ratios.

Auxiliary transmission sections are of three general types: range type, splitter type or combined range/splitter type.

In compound transmissions having a range type auxiliary section, the range section ratio step or steps are greater than the total ratio coverage of the main transmission section and the main section is shifted progressively through its ratios in each range. Examples of compound transmissions having range type auxiliary sections may be seen by reference to U.S. Pat. Nos. 4,974,474; 4,964,313; 4,920,815; 3,105,395; 2,637,222 and 2,637,221, the disclosures of which are hereby incorporated by reference.

Assignee's well known RT/RTO 11609 and RT/RTO 11610 "Roadranger" transmissions are examples of a "(4+1)×(2)", nine speed and "(5)×(2)" ten speed heavy duty range type transmissions.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference. A three gear layer, four-speed combined splitter/range type auxiliary section may be seen by reference to U.S. Pat. No. 4,754,665, the disclosure of which is hereby incorporated by reference. Assignee's well known RT/RTO 11613 and RT/RTO 14718 "Eaton Roadranger" transmissions are examples of a "(4+1)×(3)" thirteen-speed and a "(4+1)×(4)" eighteen-speed combined range/splitter type transmission.

Another example is the "Ecosplit" model of transmission sold by Zahnradfabrik Friedrichshafen Aktiengeseushaft of Friedrichshafen, Federal Republich of Germany which is a "(2×4×2)" sixteen forward speed type of transmission and utilizes a separate two-speed splitter auxiliary section in front of, and a separate range auxiliary section behind, the main transmission section.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows section of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

In compound transmissions of the range or the combined range/splitter or splitter/range types, the main transmission section is typically shifted by means of a shift bar housing assembly, or single shift shaft assembly, controlled by a manually operated shift lever or the like and the auxiliary range section is shifted, in "repeat H" type transmissions, by means of button or switch, usually manually operated, which controls a remote slave valve/actuator mechanism. In so-called "double H" or "one and one-half H" type controls, the range is shifted by switches responsive to positioning of the shift lever. Double H type controls are well known in the prior art as may be seen by reference to U.S. Pat. Nos. 4,633,725 and 4,275,612, the disclosures of which are incorporated hereby by reference.

In certain splitter sections, especially front splitter sections, the splitter section utilizes synchronized jaw clutches. Accordingly, to provide acceptable shift quality and prevent undue wear and/or damage to the splitter section synchronized jaw clutches, it has been an object of the prior art to provide devices to assure that a splitter shift be initiated and hopefully completed while the main disconnect coupling, such as a master clutch or torque converter disconnect clutch, is disengaged.

In view of the above, the prior art compound synchronized splitter type transmissions usually include a control system, usually a pneumatic control system, including interlock devices, which allowed a splitter shift to be preselected by use of a selector button or switch at a master control valve but not initiated until the disconnect is disengaged and which exhausted the splitter actuator wherever the disconnect was reengaged. Such systems typically utilized interlocks of the mechanical type on the splitter section actuator mechanical linkage which physically prevented movement of the splitter section shift fork until the disconnect device was disengaged and/or of the dump valve type wherein the valve (often called the "slave valve") supplying pressurized air to the splitter section pistons is not provided with pressurized fluid until and/or unless disengagement of the disconnect device is sensed.

While the prior art systems do provide considerable protection for the splitter section synchronizers by preventing initiation of a splitter shift and/or deenergizing the splitter shift actuators when the disconnect device is engaged, they are not totally satisfactory as while they assure that a splitter section shift will not initiate and/or proceed while the disconnect (master clutch) is engaged, they will not retain the splitter in a given position and are thus subject to splitter clutch slip out. Further, if the master clutch is reengaged prior to completion of a splitter shift, the transmission will be hung up in neutral and a second master clutch disengagement operation will be required.

As is well known, under certain conditions, if the splitter synchronized clutch attempts to engage while master clutch is engaged, a portion of the engine torque may be transferred to the vehicular drive wheels entirely by the engaged synchronizer friction surfaces and the synchronizer friction members, especially the high speed splitter synchronizer, can be rapidly damaged.

SUMMARY OF THE INVENTION

In accordance with the present invention, the drawbacks of the prior art are minimized or overcome by the provision of an auxiliary section actuator control system/method including a slave valve assembly which will protect the auxiliary section synchronizers if the master clutch is engaged prior to completion of an attempted splitter section shift and which will also allow the attempted splitter section shift to be completed upon the jaw clutch members of the engaging synchronized clutch achieving a substantially synchronous rotation.

The above is accomplished by providing a valve assembly having means for sensing if the master clutch is in an engaged or disengaged condition, and is responsive to cause the selected splitter clutch, usually the high speed splitter clutch, to be applied with a first, relatively high force if the master clutch is disengaged and to be applied with a second, relatively lower force if the master clutch is engaged.

The relatively high force is obtained by pressurizing the larger face of a differential area piston while the lower force is obtained by pressurizing both faces of the differential area piston.

The invention is particularly well suited for controlling the engagement of the splitter high speed synchronized clutch. Protection for the low speed synchronized splitter section clutch is usually not required as, when shifting into the low speed splitter ratio, torque across the synchronizer friction surfaces will tend, especially in pin type synchronizers, to cause unblocking of a blocked synchronizer to cause rapid engagement of the clutch.

A valve assembly especially useful for the present invention is effective to control the pressurizing and exhausting of a first larger area piston face chamber and a second smaller area piston face chamber in a differential area piston type pneumatic shift actuator The valve is constantly biased to a first position for engaging a high speed splitter section ratio with a relatively high force by pressurizing the first and exhausting the second chamber and is movable by selector actuated pilot means to a second position for engaging a low speed splitter section ratio with a relatively high force by pressurizing the second and exhausting the first chamber. Override means are provided to move the valve from the first to a third position wherein both chambers are pressurized upon sensing (i) the high speed ratio is or is being engaged and (ii) the master clutch is engaged. In the third position of the valve, the high-speed ratio clutch will be urged into and maintained in engagement with a relatively smaller force.

Accordingly, it is an object of the present invention to provide a new and improved splitter section shifting control system for a compound transmission of the type utilizing one or more synchronized jaw clutches in the splitter section thereof.

Another object of the present invention is to provide a pressurized fluid actuated splitter section actuator control system and method for urging engagement of a selected splitter section synchronized clutch (usually the high speed ratio) with a relatively high force if the master clutch is not engaged or with a relatively low force if the master clutch is engaged.

These and other objects and advantages of the present invention will become apparent from a reading of the detailed description of the preferred embodiment taken in connection with the attached drawings.

DESCRIPTION OF THE PREFERRED EMBODIMENT

Figure 1:
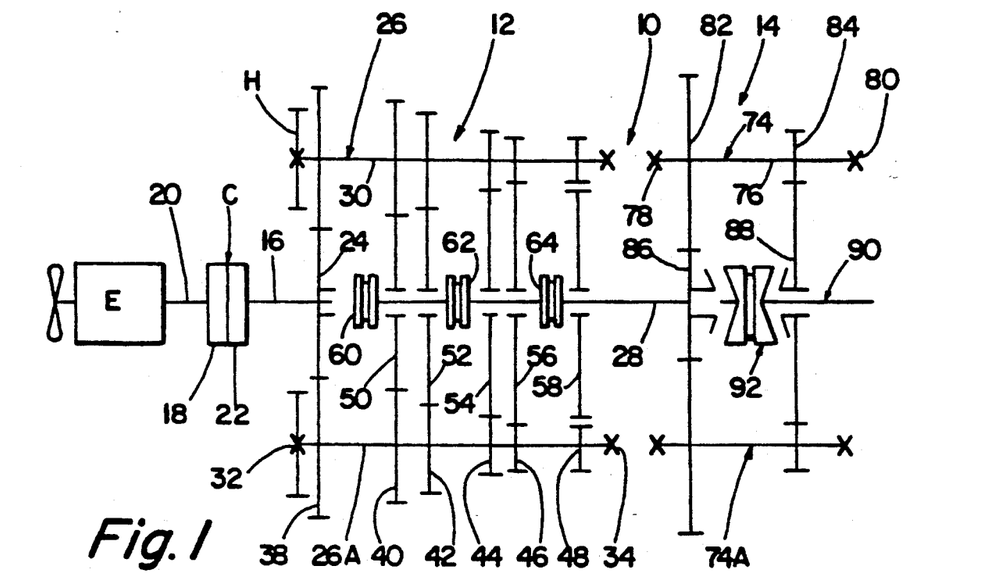
FIG. 1 is a schematic illustration of a compound transmission having a splitter type auxiliary section and utilizing the pneumatic control system of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and at least one multiple speed auxiliary transmission section connected in series whereby the selected gear reduction in the main transmission section may be compounded by further selected gear reduction in the auxiliary transmission section. "Synchronized clutch assembly" and words of similar import shall designate a positive, jaw-type clutch assembly utilized to nonrotatably couple a selected gear to a shaft by means of a positive clutch in which attempted engagement of said clutch is prevented until the members of the clutch are at substantially synchronous rotation and relatively large capacity friction means are utilized with the clutch members and are sufficient, upon initiation of a clutch engagement, to cause the clutch members and all members rotating therewith to rotate and substantially synchronous speed.

The terms "engaged" and "not disengaged" are used interchangeably and refer to a master friction clutch condition wherein torque is transferred from the vehicle prime mover (engine) to the transmission input shaft. The terms "not engaged" and "not disengaged" are used interchangeably and refer to a master friction clutch condition wherein substantially no torque is transferred from the engine to the transmission input shaft.

The term "high speed" ratio refers to that ratio of a transmission section wherein the rotational speed of the output is greatest for a given input rotational speed.

Figure 1A:
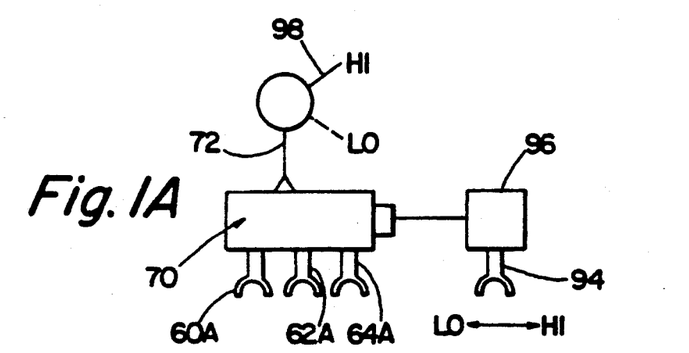
FIG. 1A is a schematic illustration of the shifting mechanisms of the transmission of FIG. 1.
Figure 1B:
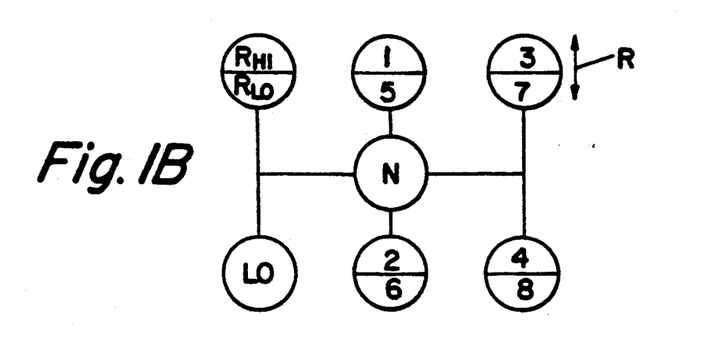
FIG. 1B is a schematic illustration of the "repeat H" type shift pattern of the transmission of FIG. 1.

Referring to FIGS. 1, 1A and 1B, a splitter type compound transmission 10 is illustrated. Compound transmission 10 comprises a multiple speed main transmission section 12 connected in series with a splitter type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

An actuator A is used to selectively disengage the normally engaged master clutch C and various operating parameters, such as position and/or actuation pressure may be monitored as signals indicative of the engaged or disengaged condition of clutch C. U.S. Pat. Nos. 4,899,858; 4,873,637; 4,729,462; and 4,646,891, the disclosures of which are incorporated herein by reference, illustrate known prior art master clutch structures and condition sensors.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as well known in the prior art. Clutch collars 60, 62 and 64 may be of the well known synchronized or nonsynchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" or "(4+1)" main section as only four of the forward speeds are compounded by the auxiliary splitter transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of a shift lever 72. As is well known, only one of the clutches 60, 62 and 64 is engageable at a given time and main section interlock means (not shown) are provided to lock the other clutches in the neutral condition.

Auxiliary transmission splitter section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support gear 86 while auxiliary section countershaft gears 84 are constantly meshed with output gear 88 which is fixed to transmission output shaft 90.

A two-position synchronized jaw clutch assembly 92, which is axially positioned by means of shift fork 94 and the splitter section shifting actuator assembly 96, is provided for clutching either gear 86 to mainshaft 28 for non direct operation or gear 88 to mainshaft 28 for direct or high speed operation of the compound transmission 10. The "repeat H" type shift pattern for compound splitter type transmission 10 is schematically illustrated in FIG. 1B. Selection and/or preselection of low (non direct) or high (direct) splitter speed operation of the transmission 10 is by means of an operator actuated switch or button 98 which is usually located at the shift lever 72.

Although the splitter type auxiliary section 14 is illustrated as a two-speed section utilizing spur or helical type gearing, it is understood that the present invention is also applicable to splitter type transmissions utilizing combined splitter/range type auxiliary sections, having three or more selectable splitter ratios and/or utilizing planetary type gearing. Also, as indicated above, any one or more of clutches 60, 62 or 64 may be of the synchronized jaw clutch type and transmission sections 12 and/or 14 may be of the single countershaft type.

The main transmission section 12 is controlled by axial movement of at least one shift rail or shift shaft contained within the shift bar housing 70 and controlled by operation of the shift lever 72. As is known, shift lever 72 may be mounted directly to, or remotely from, the transmission. Devices of this type are well known in the prior art and may be seen by reference to U.S. Pat. No. 4,621,537, the disclosure of which is hereby incorporated by reference. The splitter section is controlled by operation of button 98, as well known in the prior art. Shift bar housing 70 may also be of the more conventional multiple shift rail type, well known in the prior art as may be seen by reference to U.S. Pat. Nos. 4,782,719; 4,738,863; 4,722,237 and 4,614,126, the disclosures of which are incorporated by reference.

The control system of the present invention is equally applicable to compound transmissions having range, combined range/splitter or splitter/range type auxiliary sections.

Figure 2:
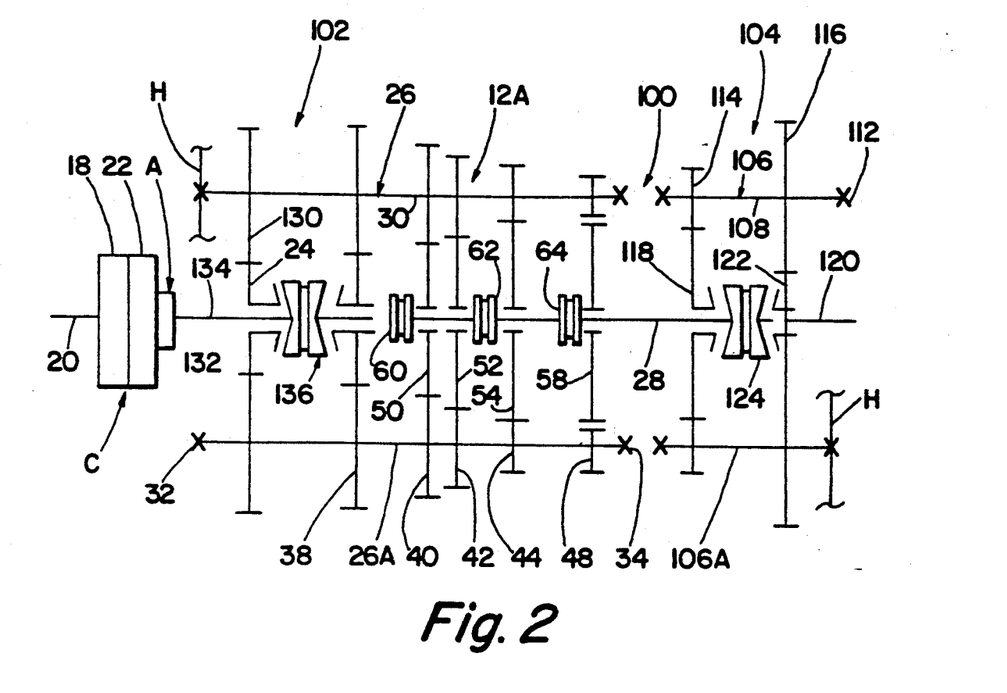
FIG. 2 is a schematic illustration of a "2×4×2" compound transmission having a front splitter section and a rear range section with which the pneumatic control system of the present invention is particularly useful.

Referring to FIG. 2, compound change gear mechanical transmission 100 is a "2×4×2" type sixteen forward speed transmission comprising a main transmission section 12A substantially identical to main transmission section 12 described above in reference to transmission 10. Main transmission section 12A of transmission 100 differs from main transmission section 12 of transmission 10 only in that the low ratio gears 46 and 56 have been eliminated, the countershafts 26 and 26A are extended and carry an additional set of countershaft gears and input gear 24 is not fixed to the input shaft. In view of the substantially identical structure of main transmission sections 12 and 12A, main transmission section 12A will not be described again in detail. A two-speed synchronized splitter section 102 is located forward of the main section 12A and a two-speed synchronized range section 104 is located to the rear of the main section.

Output range transmission section 104 includes two substantially identical auxiliary countershaft assemblies 106 and 106A, each comprising an auxiliary countershaft 108 supported by bearings 110 and 112 in housing H and carrying auxiliary section countershaft gears 114 and 116 fixed for rotation therewith. Auxiliary countershaft gears 114 are constantly meshed with and support auxiliary section range gear 118 which surrounds the output shaft 120 at the end thereof adjacent the coaxial end of mainshaft 28. Auxiliary section countershaft gears 116 constantly mesh and support auxiliary section range gear 122, which surrounds and is fixed to the output shaft 120.

A sliding two position synchronized jaw clutch assembly 124 is utilized to selectively couple either the range gear 118 or the range gear 122 to the main shaft 28. The structure and function of double acting synchronized clutch assembly 124 is substantially identical to the structure and function of synchronized clutch assembly 92 utilized in connection with transmission 10. Synchronized clutch assemblies such as assemblies 92 and 124 are well known in the prior art and examples thereof may be seen by reference to U.S. Pat. Nos. 4,462,489; 4,125,179 and 2,667,955, the disclosures of all of which are incorporated by reference.

Such clutches typically include a pair of axially engageable jaw clutch members, a sensor/blocker device for sensing nonsynchronous rotation of the jaw clutch members and blocking axial engagement thereof and a pair of friction surfaces, often conical, which are urged into contact to frictionally connect the jaw clutch members to cause substantially synchronous rotation thereof. During attempted engagement of such assemblies, assuming a substantial nonsynchronous condition, the clutch will assume a blocked position wherein the blocker device prevents axial engagement of the jaw clutch members and the friction surfaces are engaged under force.

Output shaft 120 is supported by bearings in housing H and extends therefrom for attachment of a yoke member or the like which typically forms a portion of a universal joint for driving a propeller shaft to a differential or the like. The output shaft 120 may also carry a speedometer gear and/or various sealing elements (not shown).

Two-speed synchronized splitter section 102 is connected in series at the forward or input end of main transmission section 12A.

The main section countershafts 26 and 26A are extended forwardly and carry non direct splitter countershaft gears 130 which are constantly meshed with non direct splitter input gear 132 which surrounds the extended input shaft 134.

A two position synchronized jaw clutch assembly 136 is utilized to rotationally couple either direct splitter input gear 24 or non direct splitter input gear 132 to the input shaft 134. Synchronized jaw clutch assembly 136 may be substantially identical to above discussed assemblies 92 and/or 124. If the clutch assembly remains in the blocked position under a high axial engagement force while the main transmission and the master clutch is engaged for an extended period of time, excessive torque loading can damage and/or destroy the friction surfaces.

Figure 2A:
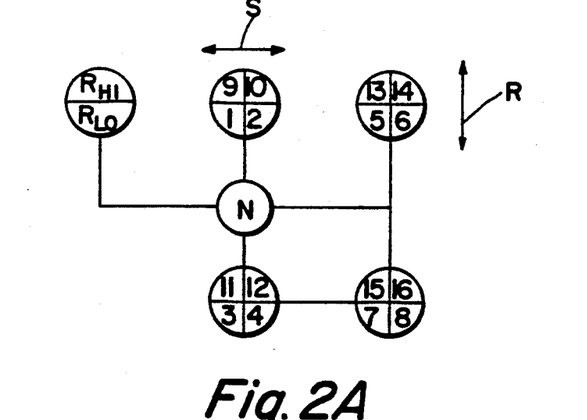
FIG. 2A is a schematic illustration of the shift pattern for the transmission of FIG. 2.

Transmissions of this general type (i.e. "2×4×2" 16 forward speeds) are well known in the prior art, one example being the above-mentioned "ECOSPLIT" transmission manufactured by Zahnradfabrik Friedrichshafen Aktiengeseushaft. The shift pattern for the transmission 100 is schematically illustrated in FIG. 2A wherein the "S" arrow indicate a splitter shift and the "R" arrow indicates a range shift.

Figure 3:
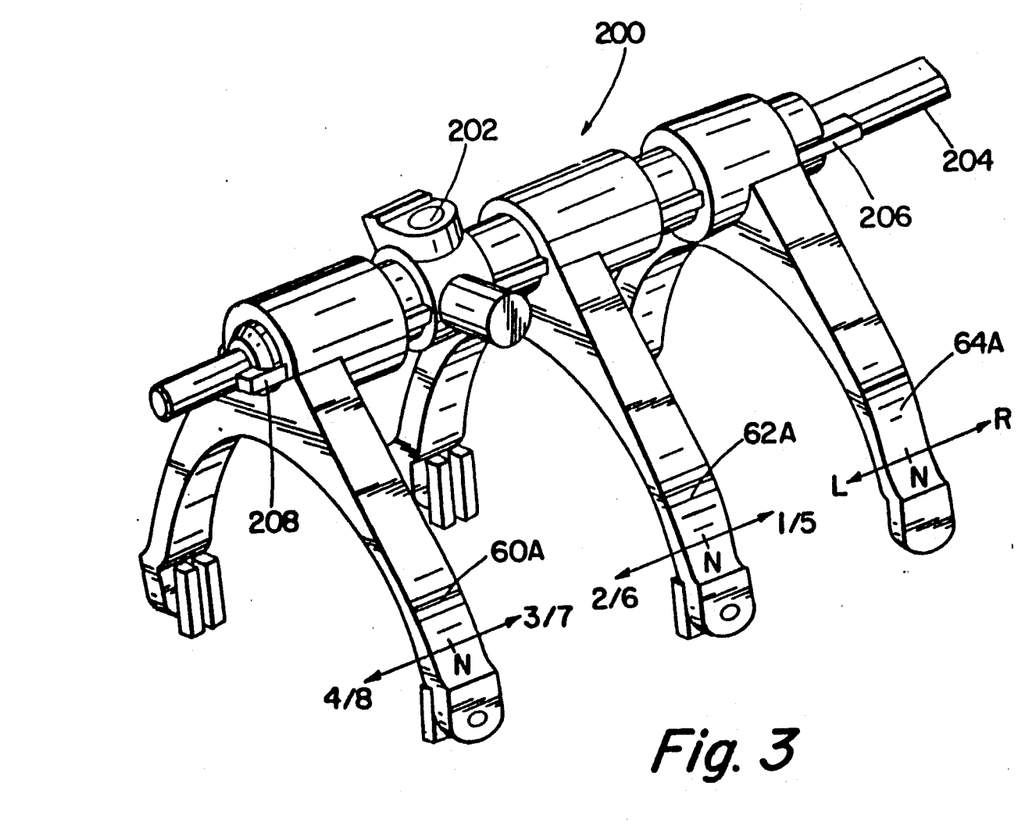
FIG. 3 is a prospective view of a single shift shaft type shifting mechanism.

In the preferred embodiment of the present invention, a single shift shaft type shifting mechanism 200 of the type illustrated in FIG. 3 is utilized. Mechanisms of this type are known in the prior art as may be seen by reference to U.S. Pat. Nos. 4,920,815 and 4,621,537, the disclosures of which are incorporated herein by reference.

Briefly, shift lever 98 will interact with block member 202 to cause rotational or axial movement of shaft 204 relative to the transmission housing. Rotational movement will cause keys, such as key 206 and another unseen key, to interact with lands or slots provided in the hubs of the shift forks 60A, 62A and 64A to axially fix two of the shift forks relative to the housing and to axially fix the other shift fork to shaft 204. Axial movement of the shaft 204 and the selected shift fork axially fixed thereto will then result in engagement and disengagement of the jaw clutches associated therewith.

The present invention is also applicable to compound transmissions utilizing the well known multiple parallel rail type shift bar housing assemblies as may be seen by reference to U.S. Pat. Nos. 4,445,393; 4,275,612; 4,584,895 and 4,722,237, the disclosures of which are hereby incorporated by reference. Such devices typically include an assembly extending perpendicular to the shift rails (often associated with a shift rail interlock mechanism) which will assume a first position when all of the shift rails are in an axially centered neutral position or a second position when any one of the shift rails is displaced from the axially centered neutral position thereof.

While the present invention is equally applicable to transmission 10 illustrated in FIG. 1 and transmission 100 illustrated in FIG. 2, as well as other compound transmissions utilizing synchronized auxiliary section jaw clutch assemblies, for purposes of simplification and ease of understanding, the present invention will be described primarily as utilized with the compound splitter type transmission illustrated in FIGS. 1, 1A, 1B and 1C.

Assuming a shift control of the type illustrated in FIG. 1B, i.e. a "repeat H" type control, the 1-2, 3-4, 5-6 and 7-8 shifts are simple splitter shifts where only the splitter section 14 is shifted while the main transmission section 12 remains engaged in its currently engaged ratio. In the upshifts mentioned above, assuming a non overdrive transmission, synchronized clutch assembly 92 must disengage non direct splitter gear 86 from, and engage direct splitter gear 88 to, the mainshaft 28. To accomplish this, the vehicle operator will preselect "HI" with the splitter selector button 98, and will briefly cause the master clutch C to be disengaged to break torque allowing disengagement of gear 86 and engagement of direct splitter gear 88. For a splitter downshift, i.e. the 2-1, 4-3, 6-5 and 8-7 shifts, the opposite will occur.

In prior art transmissions having pressurized air actuated synchronized splitter sections, a dump valve was provided for exhausting the splitter actuator wherever the master clutch was not disengaged. While this did protect the splitter synchronizers, the splitter was not maintained in a selected position and, if the master clutch was reengaged prior to completion of a splitter shift, the transmission could be hung up in splitter neutral and a further master clutch operation required to complete the attempted splitter shift.

The auxiliary section control system/method of the present invention overcomes the prior art drawbacks by reducing the force applied by shift fork 94 to engage the direct ratio splitter gear 88 to a relatively low level when a master clutch engaged condition is sensed. The relatively low actuation force is selected to be sufficient to cause the high speed synchronized splitter clutch to engage when synchronous conditions occur but low enough to assure that the risk of synchronizer burn out is minimized or eliminated.

For purposes of simplification, the present invention will be described in connection with its expected most advantageous use, namely controlling the force applied to engage the high speed synchronized splitter clutch of a splitter (10), range/splitter or splitter/range (100) type of compound transmission.

While the typical force applied to engage a synchronized splitter clutch is a function of the effective fluid pressure (usually pneumatic) applied to an effective piston area, engagement force may also be applied by electromechanical means such as electric motor driven ball screws or the like, electromagnetic means such as solenoid type devices, or other force application means. With fluid pressure application systems, the application force applied to a clutch is variable by varying the effective fluid pressure and/or effective piston area. With electromagnetic and electromechanical systems, force may be varied by varying the electric current, voltage or the like.

While not intending to so limit the present invention, the present invention will be described in its preferred mode of a pneumatic actuation system.

In the prior art splitter clutch actuators, assuming a splitter shift has been selected/preselected, the master clutch has been disengaged and the slave valve interlock, if any, is released, the splitter slave valve will provide the selected chamber of the splitter clutch actuation cylinder/piston with a pressure (usually regulated to about 60 psi-to-80 psi) sufficient to apply a force (about 300 to 400 lbs.) to quickly move the selected clutch into engagement and/or into the blocked position and to apply a significant synchronizing force through the synchronizer friction cones to cause rapid synchronous rotation of the clutch members, unblocking of the synchronizer and movement of the clutch members through the blocker and into positive engagement. If the master clutch remains disengaged, or in the event of a splitter section shift into the splitter low-speed ratio, the force will not result in damage to the synchronizer and will result in a relatively quick range section engagement. However, in the event the master clutch is engaged prior to completion of an attempted splitter section upshift into the range section high speed ratio, serious damage to and/or destruction of the synchronizer friction surfaces may occur relatively quickly.

It has been discovered that, upon sensing conditions indicative of a master clutch engagement prior to completion of an attempted splitter section shift into the splitter section high speed ratio, if the force applied to engage the direct range clutch is reduced to a relatively lower second level (about 40 to 80 lbs.) the high speed ratio synchronized splitter clutch will still engage upon a substantially synchronous rotation of the clutch members while the synchronizers will not, at least within a predetermined time (such as 20 to 45 seconds), be damaged or destroyed.

The second lower force is not acceptable for normal engagement of the splitter synchronizer clutches as a sufficient force is not applied to the synchronizer friction clutches and many splitter shifts would take an objectionably long period of time.

Reducing the forces upon reengagement of the master clutch will also allow the high speed ratio to be maintained with less stress on the actuator members.

While a variable pressure pressure-regulator may be used to achieve a second force level for applying the direct splitter clutch, in the preferred embodiments a differential area piston method is utilized. As may be seen by reference to FIGS. 5, 6 and 7, the splitter clutch actuator piston assembly 200 defines a differential area piston 221 having a first surface area 222 (about 3.96 sq. inches) pressurized to engage the low speed splitter clutch, and a second larger surface area 224 (about 4.65 sq. inches) pressurized to engage the high speed splitter clutch with the first level of force ($p^*a_{224}$). Pressurizing both the surface areas will result in regulated pressure (80 psi) applied to the differential area (the second surface area 224 minus the first surface area 222) and is effective to apply the high speed splitter clutch with a relatively low second level of force ($p^*(a_{224}-a_{222})$ equaling about 54 lbs).

Figure 5:
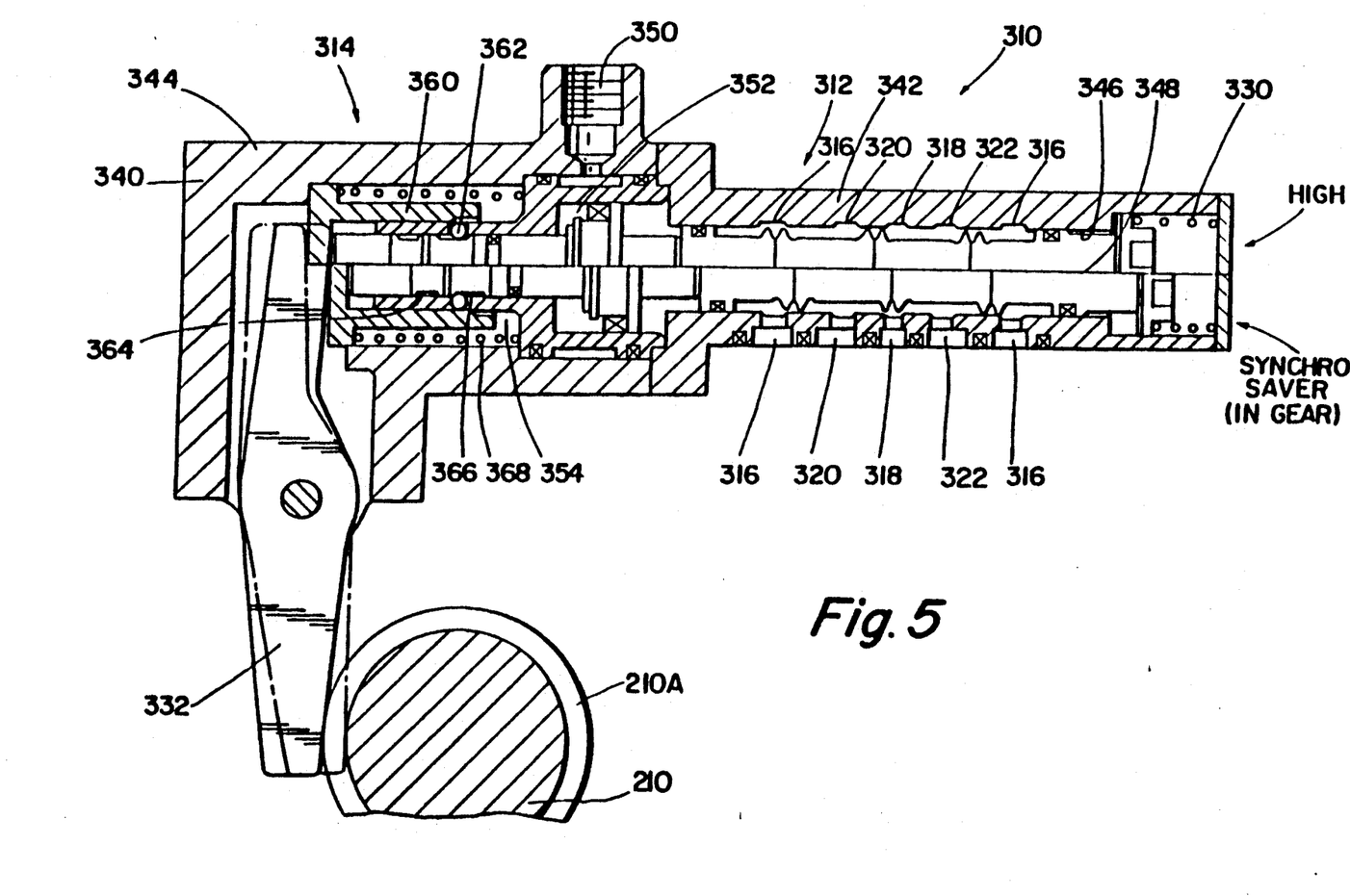
FIG. 5 is a sectional view of the valve assembly for the air control system illustrated in FIG. 4.
Figure 6:
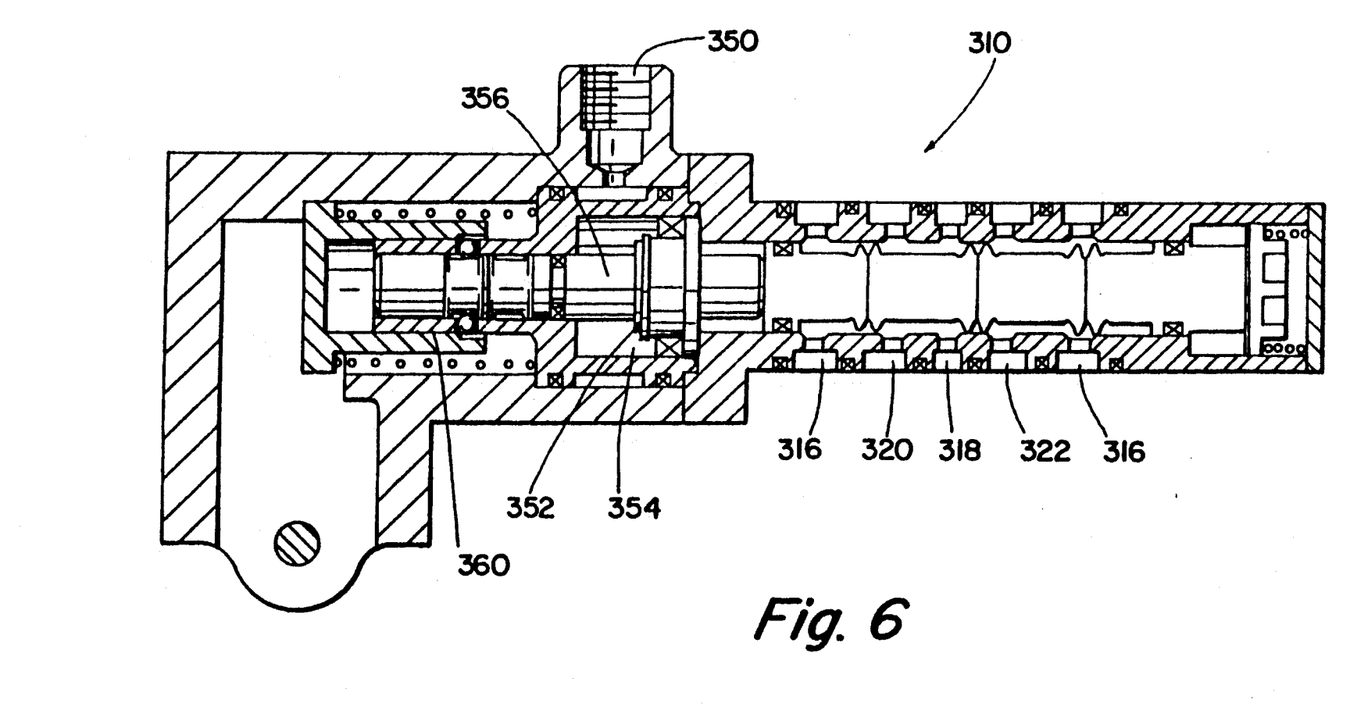
FIG. 6 is a sectional view of the valve assembly of FIG. 5 in a different operational position thereof.
Figure 7:
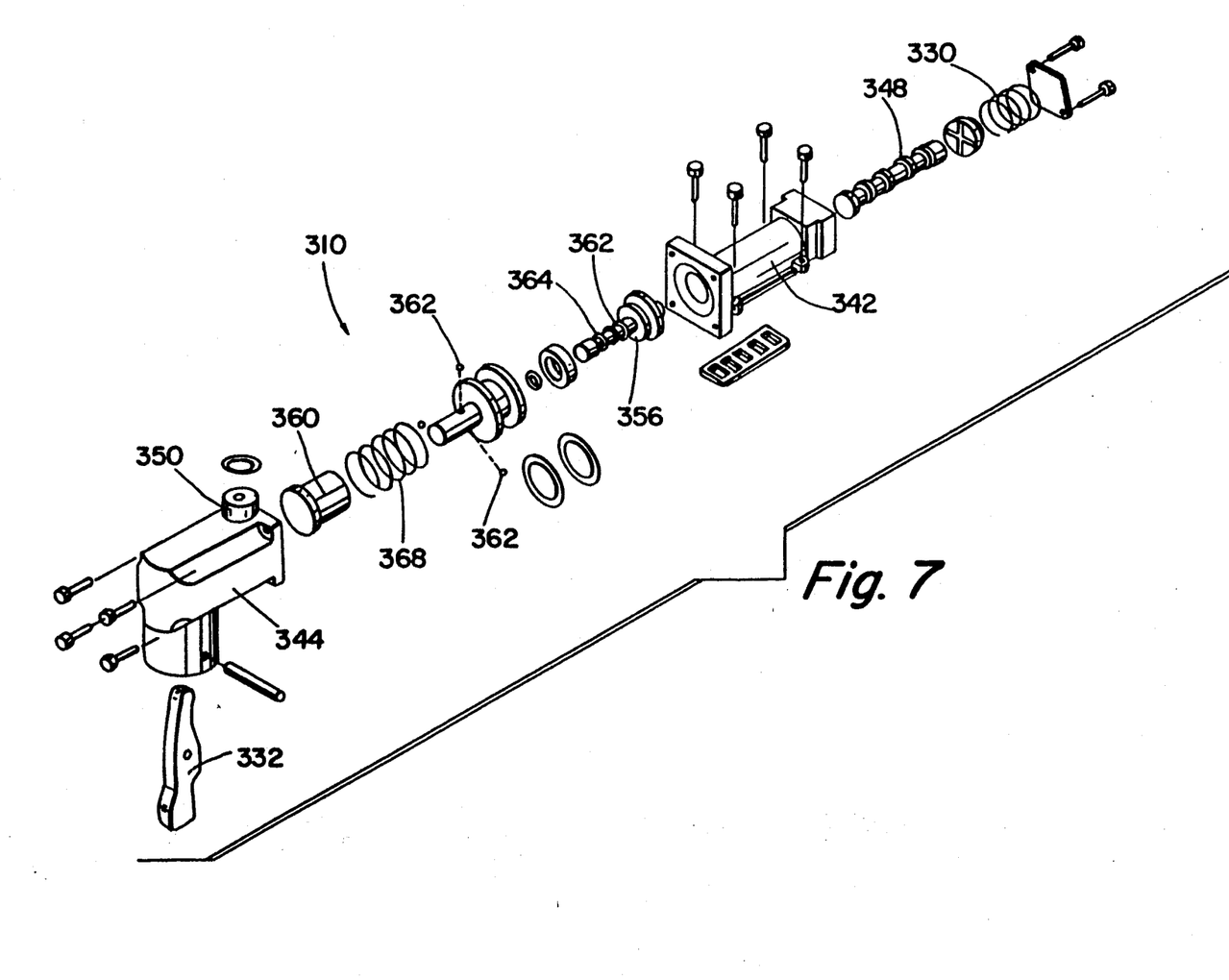
FIG. 7 is an exploded view of the valve assembly of FIG. 5.

Piston 221 is sealingly and slidably received in a cylinder divided into two chambers 222A and 224A. Piston 221 includes a shaft 226 to which is mounted shift yoke 94 for shifting two position synchronized clutch assembly 92 or 136 to the selected positions thereof.

To provide the synchronizer protection effect, while still urging the high speed splitter clutch into engagement, the present invention is effective to (i) pressurize only the second surface area 224 when a splitter shift into high speed is selected and the master clutch C is disengaged and (ii) to pressurize both the first and the second surface areas (222 and 224) when a splitter section shift into high speed is selected and the master clutch is engaged.

The second force level must be sufficient to cause a high speed splitter clutch engagement when synchronous or substantial synchronous rotation of the high speed splitter clutch clutch members is achieved and preferably should be sufficient to maintain the high speed in engagement (or in-gear detent means should be provided). The second force should be sufficiently low so that when the synchronizer is engaged on the block, with the master clutch engaged, the synchronizer cone clutches or the like will not suffer substantial damage for a predetermined period of time, such as, for example, twenty (20) to forty-five (45) seconds.

As an example, a first force of about 300 to 400 lbs with a second force of about 40 to 80 lbs. has proven highly satisfactory.

Figure 4:
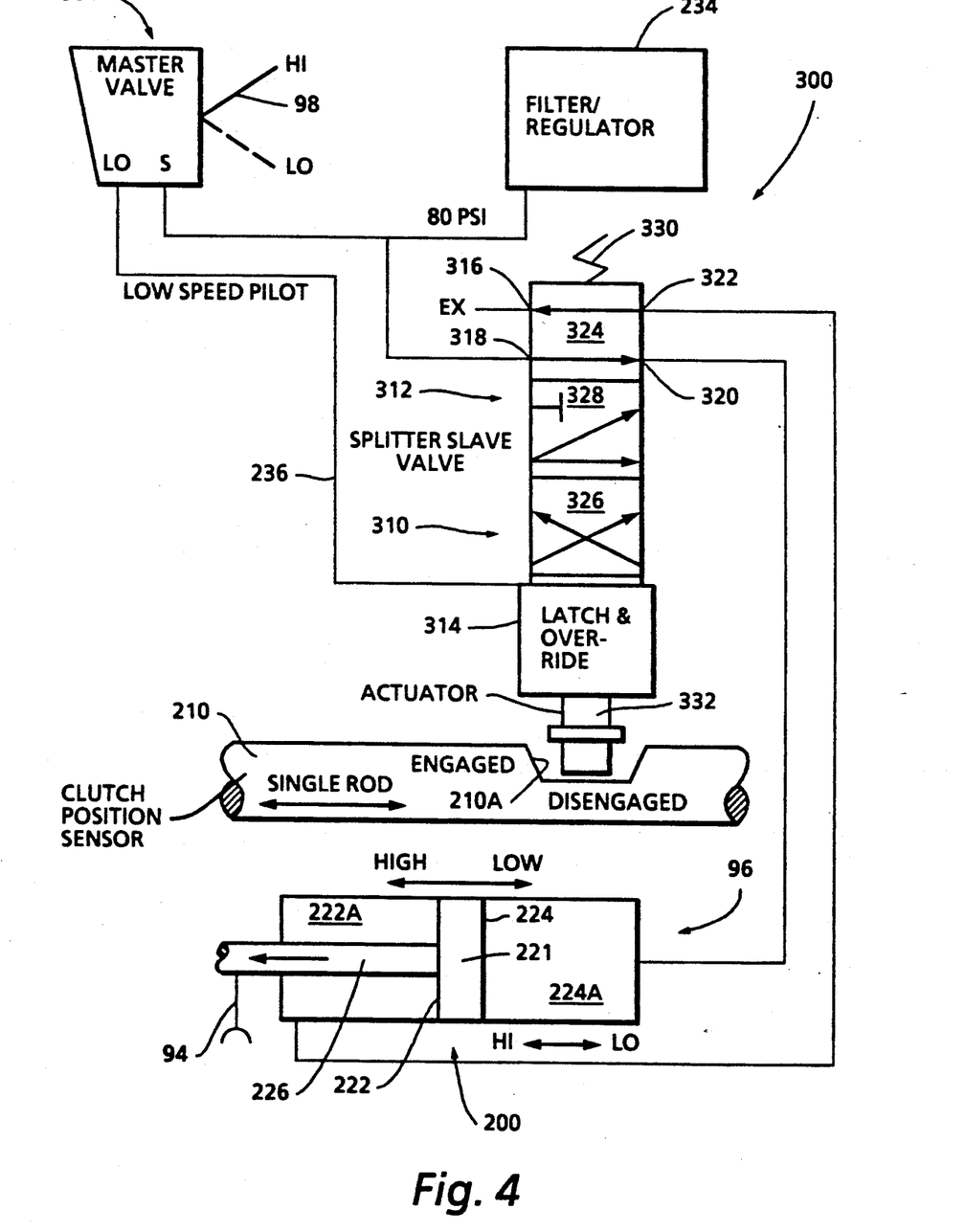
FIG. 4 is a schematic illustration of a preferred air control system for implementing the present invention.

Schematics of air systems to achieve the above effect may be seen by reference to FIG. 4 while a valve assembly particularly well suited to achieve the above may be seen by reference to FIGS. 5, 6 and 7.

As indicated previously, the not engaged and the disengaged conditions of the master clutch C may be sensed by sensing axially nondisplaced or displaced positions of a shaft 210 associated with the clutch actuator A. The shaft 210 may respond to displacements of clutch actuator, pressurization of the clutch actuator or the like. Shaft 210 is provided with a notch or groove 210A the axial position of which is indicative of the engaged or disengaged condition of the master clutch.

Devices for applying either a first or a second relatively lesser force to shifting forks, such as engaging with a larger first and disengaging with a second smaller force, are known in the prior art as may be seen by reference to U.S. Pat. No. 4,928,544, the disclosure of which is hereby incorporated by reference.

A synchronizer protecting splitter shift air control system 300 is schematically illustrated in FIG. 4. The control system 300 includes a master valve 301 having a selector switch 98 for selecting high (HI) or low (LO) splitter ratio. The master valve 301 may also include a second selector switch (not shown) for selecting either a range high or a range low range ratio. A splitter low speed pilot line 236 controls the operation of the splitter slave valve 310.

The splitter slave valve assembly 310 includes a three-position, four-way valve 312 and a latch and override mechanism 314. Valve 312 has port 316 connected to exhaust, a port 318 connected to source air from the filter/regulator 234 (80 psi), a port 320 connected to the high splitter cylinder 224A of the differential area piston assembly 220, and a port 322 connected to the low splitter cylinder 222A of the differential area piston assembly 220.

Valve 312 has a first 324 position (upper position in FIG. 5), for selecting the high speed splitter ratio, wherein the high speed splitter cylinder 224A is connected to source pressure and the low splitter cylinder 222A is vented to exhaust. Valve 312 has a second 326 position (lower position in FIG. 5), for selecting low speed splitter ratio, wherein the low speed splitter cylinder 222A is connected to source pressure and the high speed splitter cylinder 224A is vented to exhaust. Valve 312 has an intermediate or third 328 position (see FIG. 6) wherein both the high (224A) and the low (222A) speed splitter cylinders are connected to the source pressure.

The valve 312 is spring 330 biased into the first (324) or high speed range position and may be moved to its second (326) or low speed range position by action of low range pilot pressure from line 236. By mechanical means of an override actuator lever or link 332 interacting with the notch 210A and adjacent land on shaft 210, the valve is movable from the first (324) position to the intermediate third (328) position thereof if the master clutch is moved to an engaged position while the valve is in the first position thereof.

The latch function of the latch and override assembly 314 is to prevent the valve from moving from the first 324 to the second 326, or from the second 326 to the first 324, positions thereof when the clutch C is engaged but not to prevent movement of the valve from the first 324 to the intermediate 328 third positions thereof. The latch and override assembly thus provides the splitter interlock function of preventing initiation of a splitter shift until the master clutch is disengaged. A specific structure for the valve 312 and the latch and actuator assemblies 314 is illustrated in FIGS. 5, 6 and 7 and described in greater detail below.

In operation, for a shift from high to low splitter ratio, the selector 98 will be moved to select/preselect the "LO" position and pilot line 236 will be pressurized. As soon as the shift shaft position indicates the master clutch is disengaged, the latch 314 will release allowing the valve mechanism 312 to assume the second position 326 thereof which will cause pressurizing of low splitter chamber 222A and exhaust of high splitter chamber 224A. The override does not effect the valve in the second position 326 thereof, and thus the positioning of valve 312 will remain as is until selector 98 is moved.

To shift from low to high splitter ratio, the selector 98 will be moved to select/preselect the "HI" position and the pilot line 236 will be exhausted. As soon as the shaft 210 position indicates a master clutch disengaged condition, the latch is released and the valve 312 will move to the first 324 position thereof under the bias of spring 330. High splitter chamber 224A will be pressurized and low range chamber 222A will be exhausted. Thereafter, as the master clutch is engaged, the actuator link 332 will move the valve 312 from the first position (324) to the third or intermediate position (328) wherein both the high splitter ratio (224A) and low splitter ratio (222A) cylinder chambers are pressurized to provide a reduced force on the shift fork 94, urging the high speed splitter synchronized clutch into engagement.

To accommodate both direct and overdrive type splitter sections, the orientation of actuator assembly 200 and/or valve assembly 310 should be easily reversible.

The structure of the splitter slave valve assembly 310 is illustrated in FIGS. 5, 6 and 7. Splitter slave valve assembly 310 is contained within a two-piece housing 340 defining a spool housing portion 342 and a latch and override mechanism portion 344. Valve spool portion 342 defines an internal bore 346 in which is received a valve spool 348 and also defines ports 316 (two), 318, 320 and 322 connected to exhaust, supply, the low splitter piston chamber 222A and the high splitter piston chambers 224A, respectively. A port 350 for connection to the low speed pilot line 236 is defined in the latch and override portion. The leftward end of valve spool is provided with a piston surface 352 sealingly and slidably received in a chamber 354 communicating with port 350. Biasing spring 330 is seated at the rightward end of bore 346 and engages the end of valve spool 348 to urge the valve spool leftwardly.

The first position 324 of valve 312 corresponds to the most leftwardly position of valve spool 348 as seen in the upper half of FIG. 5. In this position, ports 318 and 322 are in fluid communication, ports 320 and the left port 316 are in fluid communication, and the right port 316 is sealed from the other ports.

The second position 326 of valve 312 corresponds to the rightwardly position of valve spool 348 as illustrated in FIG. 6. In this position, ports 318 and 320 are in fluid communication, ports 322 and righthand port 316 are in fluid communication and the left hand port 316 is sealed from the other ports. As illustrated in FIG. 6, spool 348 may be urged to the rightward or second position either by pressurizing the chamber 352 through port 350 and low splitter pilot line 236 (lower portion of FIG. 9) or by means of a lever or link.

The third or intermediate position 328 of valve 312 is illustrated in the lower portion of FIG. 5. In this position, both ports 320 and 322 fluidly communicate with source port 318 and both exhaust ports are sealed from the other ports. As may be seen by reference to FIG. 5, when lever actuator 332 rides on the outer surface of shaft 210, the lever will engage a portion of push rod 356 to urge the spool to the intermediate position thereof. It is noted, that when the spool is in the rightward most position, i.e., the second position 326 of valve 312, the override lever 332 (see FIG. 5) will not effect the position of the spool.

The latch function of the latch and override assembly 314, is providing the splitter interlock function of preventing initiation of a splitter shift until the master clutch is disengaged, and is accomplished by collet 360, detent roller 362 and grooves 364 and 366 in the push rod extension 356 of the valve spool. Detents 362 are received in slots in housing portion 344 for radial movement and the outer surface of push rod extension 356 includes a first detent groove 364 which will align with the detent rollers when the spool is in the second position thereof (FIG. 6) and a second detent groove 366 which is elongated and will align with the detents when the spool is in either the first position or in the second position or is in transit therebetween. When the collet 360 is in the retracted position under the bias of spring 368, see the top of FIG. 5 and FIG. 6, the detents rollers 362 are movable radially outwardly and will not effect the axial movement of the valve spool 348. However, when the collet is pushed rightwardly by the lever 332, see the bottom of FIG. 8, the detent rollers 362 are locked against axially outward movement and the spool 348 is interlocked in either the first to the intermediate (third) axial position or in the second axial position thereof.

An "exploded" view of the range valve assembly 310 may be seen by reference to FIG. 7. For purposes of clarity, the various seals, gaskets and the like are not identified by reference numerals.

While the present invention has been described with a certain degree of particularity, it is understood that the present description is by way of example only and that modification and rearrangement of the parts is possible within the spirit and the scope of the present invention as hereinafter claimed.

I claim:

1. A control method for controlling a shift actuator (96) associated with a synchronized jaw clutch (92) for selectively engaging and disengaging a selectable ratio (high) in a first transmission section (14) of a vehicular compound transmission (10) comprising first and second (12) multiple speed sections connected in series, said transmission having an input shaft (16) for connection to a prime mover (E) through a selectively engageable and disengageable disconnect member (C) said method comprising:
   (a) sensing selection of engagement of said first transmission section selectable ratio;
   (b) sensing if the disconnect member is in either an engaged or a disengaged condition;
   (c) responding to sensing (i) a selection of engagement of said first transmission section selectable ratio and (ii) said disconnect member being disengaged by causing said actuator to urge said synchronized jaw clutch into engagement with a first force (p * $a_{224}$); and
   (d) responding to sensing (i) a selection of engagement of said first transmission section selectable ratio and (ii) said disconnect member being engaged by causing said actuator to urge said synchronized jaw into engagement with a second force (p * ($a_{224} - a_{222}$)), said second force being considerably smaller than said first force.

2. The method of claim 1 wherein said first force is at least twice as large as said second force.

3. The method of claims 1 or 2 wherein said compound transmission is a manually operated splitter type transmission, said first transmission section is an auxiliary splitter section having a high speed and a low speed ratio and said selectable ratio is the high speed splitter section ratio.

4. The method of claim 3 further comprising:
   (e) prohibiting initiation of engagement of said selectable ratio until said disconnect member is sensed as being disengaged at the time of or after a selection of engagement of said selectable ratio.

5. A method for controlling the shifting of a compound change gear vehicular transmission (10) of a type comprising a manually shifted multiple-speed main transmission section (12) connected in series with a multiple-speed splitter section (14/102), said splitter section including low-speed and high-speed synchronized jaw clutches (92) shiftable by an actuator (96) to engage either a low-speed or a high speed splitter section ratios, respectively, in response to selection by a master selector (98), said transmission including an input shaft (16/134) drivingly connected to the vehicular prime mover (E) through a selectively engaged and disengaged friction master clutch, said method characterized by:
   sensing a selection of a shift of said splitter section into a selected one of the low-speed and the high-speed splitter section ratios;
   sensing said master clutch being in either an engaged or in a disengaged condition thereof,
   responding to sensing (i) a selection of a shift into the splitter section high-speed ratio and (ii) said master clutch in the disengaged condition by causing said actuator to urge said splitter section high speed synchronized jaw clutches into engagement with a first force level; and
   thereafter responding to (i) a continuing selection of a shift into splitter section high-speed ratio and (ii) said master clutch in an engaged condition by causing said actuator to urge said splitter section high speed synchronized jaw clutches into engagement with a second force level, said second force level being considerably lower than said first force level.

6. The method of claim 5 further comprising:
   responding to sensing (i) a selection of a shift into the splitter section low-speed ratio and (ii) said master clutch in the disengaged condition, by causing said actuator to urge said splitter section low-speed synchronized clutches into engagement with a third force level substantially equal to said first force level; and
   thereafter, responding to a continuing selection of a shift into the splitter section low-speed ratio by causing said actuator to urge said splitter section low-speed synchronized clutch into engagement with said third force level regardless of the engaged or disengaged condition of said master clutch.

7. The method of claims 5 or 6 wherein said splitter section (14/102) is a two-speed splitter section and said high speed ratio is a direct speed ratio.

8. The method of claims 5 or 6 further comprising prohibiting initiation of a selected splitter section shift until a master clutch in the disengaged condition is sensed.

9. The method of claims 5 or 6 wherein said first force level is at least twice as large as said second force level.

10. The method of claim 7 wherein said first force level is at least twice as large as said second force level.

11. The method of claim 8 wherein said first force level is at least twice as large as said second force level.

12. The method of claims 5 or 6 wherein said high-speed splitter synchronized clutch comprises a pin type synchronizer.

13. The method of claim 6 wherein said first force is substantially equal to the sum of said second and third forces.

14. The method of claims 5 or 6 wherein said compound transmission is a vehicular transmission having a maximum rated input torque and is intended for use in a vehicle having a maximum expected g.v.w., said second force selected to be (a) sufficient to cause engagement of said splitter section high speed synchronized clutch when the jaw clutch members thereof are rotating at a substantially synchronous speed, and (b) insufficient over a predetermined period of time to cause greater than a predetermined wear to the friction surfaces of the splitter section high speed synchronized clutch when (i) said clutch is urged into engagement with said master clutch engaged, (ii) said jaw clutch members are rotating at significantly nonsynchronous speed, (iii) said maximum rated input torque is applied to the transmission input shaft and (iv) said vehicle has the maximum expected g.v.w.

15. A method for controlling a shift actuator for an auxiliary transmission section of a compound vehicular transmission including a main transmission section having engaged and not engaged positions connected in series with said auxiliary transmission section, said transmission having an input shaft driven by a vehicular prime mover through a selectively engaged and disengaged friction coupling, said auxiliary transmission section including a selectable high-speed ratio and a selectable low-speed ratio, each of said auxiliary section ratios engageable by a synchronized jaw clutch assembly, switch means for selecting a desired auxiliary section ratio, said actuator comprising a first force application means for apply a first force in a first axial direction to said synchronized clutch assembly and a second force applications means for applying a second force in a second axial direction opposite said first axial direction to said synchronized clutch assembly, said first force larger than said second force, force in said first axial direction effective to urge said synchronized clutch assembly to engage said high speed ratio and force in said said second axial direction effective to urge said synchronized clutch assembly to engage said low speed ratio, said method comprising:
   sensing the current engaged or disengaged position of said friction coupling, and
   applying said second force whenever said friction coupling is in the engaged position thereof.

16. The method of claim 15 further comprising:
   applying said first force and not applying said second force when said friction coupling is in the disengaged position thereof and the high-speed ratio has been selected.

17. The method of claims 15 or 16 further comprising:
   applying both the first and second forces when high-speed ratio is selected and said friction coupling is in the engaged position thereof after an initial application of said first force without application of said second force.

18. The control method of claims 15 or 16 further comprising applying said second force and not applying said first force when low-speed ratio is selected.

19. A control system for controlling a shift actuator (96) associated with a synchronized jaw clutch (92) for selectively engaging and disengaging a selectable ratio in a first transmission section (14) of a compound transmission (10) comprising first and second (12) multiple speed sections connected in series, said transmission having an input shaft (16) driven by a vehicular prime mover (E) through a selectively engaged and disengaged friction coupling (C), said system comprising:
   (a) means for sensing selection of engagement of said first transmission section selectable ratio (98);
   (b) means for sensing if the friction coupling is in either an engaged or a disengaged condition (210/210A);
   (c) means (324) for responding to sensing (i) a selection of engagement of said first transmission section selectable ratio and (ii) said friction coupling being disengaged by causing said actuator to urge said synchronized jaw clutch into engagement with a first force; and
   (d) means (328) for responding to sensing (i) a selection of engagement of said first transmission section selectable ratio and (ii) said friction coupling being engaged by causing said actuator to urge said synchronized jaw clutch into engagement with a second force, said second force being considerably smaller than said first force.

20. The system of claim 19 wherein said first force is at least twice as large as said second force.

21. The system of claims 19 or 20 wherein said compound transmission is a manually operated splitter type transmission, said first transmission section is an auxiliary splitter section having a high speed and a low speed ratio and said selectable ratio is the high speed splitter section ratio.

22. The system of claims 19 or 20 further comprising:
   (e) means (314) for prohibiting initiation of engagement of said selectable ratio until said friction coupling is sensed as disengaged after a selection of engagement of said ratio.

23. The system of claims 19 or 20 wherein said friction coupling comprises a manually operated normally engaged vehicular master clutch.

24. The system of claims 19 or 20 wherein said high-speed auxiliary synchronized clutch comprises a pin type synchronizer.

25. The system of claims 19 or 20 wherein said vehicular transmission has a maximum rated input torque and is intended for use in a vehicle having a maximum expected g.v.w., said second force selected to be (a) sufficient to cause engagement of said auxiliary section high speed synchronized clutch when the jaw clutch members thereof are rotating at a substantially synchronous speed, and (b) insufficient over a predetermined period of time to cause greater than a predetermined wear to the friction surfaces of the auxiliary section high speed synchronized clutch when (i) said clutch is urged into engagement with said main section engaged, (ii) said jaw clutch members are rotating at significantly non-synchronous speed, (iii) said maximum rated input torque is applied to the transmission input shaft and (iv) said vehicle has the maximum expected g.v.w.

26. A method for controlling a pressurized fluid operated shift actuator (220) for an auxiliary transmission section (14/102) of a vehicular compound transmission (10) including a main transmission section (12/12A) connected in series with said auxiliary transmission section, said transmission having an input shaft (16) for driven connection to a prime mover (E) through a selectively engaged and disengaged friction coupling, said auxiliary transmission section including a selectable high speed ratio and a selectable low speed ratio, each engageable by a synchronized jaw clutch assembly (92/136), switch means (98) for selecting a desired auxiliary section ratio, said actuator (220) comprising a differential area piston (221) having a first piston surface (224) defining a first chamber (224A) and a second piston surface (222) defining a second chamber (222A), said first piston surface defining a first piston surface area ($a_{222}$) being larger than a second piston surface area ($a_{222}$) defined by said second piston surface, pressurization of said first chamber (224A) causing said actuator to urge said synchronized clutch assembly to engage said high speed ratio and pressurization of said second chamber (222A) causing said actuator to urge said synchronized clutch assembly to engage said low speed ratio, each of said chambers selectively connectable to a common source (234) of pressurized fluid and to an exhaust (EX), said method comprising:
   sensing the current engaged or disengaged position of said friction coupling, and
   pressurizing said second chamber whenever said friction coupling is in the engaged position thereof (326/328).

27. The method of claim 26 further comprising:
   pressurizing said first chamber and exhausting said second chamber when said friction coupling is in the disengaged position thereof and the high-speed ratio has been selected.

28. The method of claims 26 or 27 further comprising:
   pressurizing both the first and second chambers when said high speed ratio is selected and said friction coupling is in the engaged position thereof after an initial pressurization of said first chamber and exhaust of said second chamber (328).

29. The control method of claims 26 or 27 further comprising pressurizing said second chamber and exhausting said first chamber when the low speed ratio is selected.

30. The control method of claim 28 further comprising pressurizing said second chamber and exhausting said first chamber when said low-speed ratio is selected.

31. The method of claims 26 or 27 wherein said fluid is compressed air.

32. The method of claim 26 or 27 wherein said auxiliary section is a splitter section.

33. The method of claim 28 wherein said auxiliary section is a splitter section.

34. The method of claims 26 or 27 wherein the effective area of said first surface ($a_{224}$) is less than twice as large as the effective area of said second surface ($a_{222}$).

35. The method of claim 28 wherein the effective area of said first surface is less than twice as large as the effective area of said second surface.

36. A method for controlling a pressurized fluid operated shift actuator for an auxiliary transmission section of a compound vehicular transmission including a main transmission section having engaged and not engaged positions connected in series with said auxiliary transmission section, said transmission having an input shaft for driven connection to a vehicular prime mover through a manually operated selectively engaged and disengaged friction master clutch, said auxiliary transmission section including a selectable high speed ratio and a selectable low speed ratio, each engageable by a synchronized jaw clutch assembly, switch means for selecting a desired auxiliary section ratio, said actuator comprising a differential area piston having a first piston surface defining a first chamber and a second piston surface defining a second chamber, said first piston surface defining an area being larger than the area defined by said second piston surface, pressurization of said first chamber causing said actuator to urge said synchronized clutch assembly to engage said high speed ratio and pressurization of said second chamber causing said actuator to urge said synchronized clutch assembly to engage said low speed ratio, each of said chambers selectively connectable to a common source of pressurized fluid and to an exhaust, said method comprising:

sensing the current engaged or disengaged position of said master clutch;

responding to sensing (i) a selection of a shift into auxiliary section high speed ratio and (ii) said master clutch in the disengaged position by pressurizing said first chamber and exhausting said second chamber; and thereafter responding to (i) continuing selection of a shift into auxiliary section high speed ratio and (ii) said master clutch in the engaged position by pressurizing both said first and said second chambers.

37. The method of claim 36 further comprising:

responding to sensing (i) a selection of a shift into the auxiliary section low-speed ratio and (ii) said master clutch in the disengaged condition by pressurizing said second chamber and exhausting said first chamber; and thereafter, responding to a continuing selection of a shift into the auxiliary section low-speed ratio by pressurizing said second chamber and exhausting said first chamber regardless of the position of the master clutch.

38. The method of claims 37 or 38 wherein said auxiliary section (14) is a two-speed splitter section and said high speed ratio is a direct speed ratio.

39. The method of claims 36 or 37 further comprising prohibiting initiation of a selected auxiliary section shift until a master clutch disengaged condition is sensed.

40. A system for controlling a pressurized fluid operated shift actuator for an auxiliary transmission section of a compound vehicular transmission including a main transmission section connected in series with said auxiliary transmission section, said transmission having an input shaft for driving connection to a vehicular prime mover through a selectively engaged and disengaged friction coupling, said auxiliary transmission section including a selectable high speed ratio and a selectable low speed ratio, each of said auxiliary section ratios engageable by a synchronized jaw clutch assembly, switch means for selecting a desired auxiliary section ratio, said actuator comprising a differential area piston having a first piston surface defining a first chamber and a second piston surface defining a second chamber, said first piston surface defining a first piston surface area being larger than a second piston surface area defined by said second piston surface, pressurization of said first chamber causing said actuator to urge said synchronized clutch assembly to engage said high speed ratio and pressurization of said second chamber causing said actuator to urge said synchronized clutch assembly to engage said low speed ratio, each of said chambers selectively connectable to a common source of pressurized fluid and to an exhaust, said system comprising:

means for sensing the current engaged or disengaged position of said friction coupling, and means for pressurizing said second chamber whenever said friction coupling is in the engaged position thereof.

41. The system of claim 40 further comprising:

means for pressurizing said first chamber and exhausting said second chamber when said friction coupling is in the disengaged position thereof and the high-speed ratio has been selected.

42. The system of claims 40 or 41 further comprising:

means for pressurizing both the first and second chambers when high speed ratio is selected and said friction coupling is in the engaged position thereof after an initial pressurization of said first chamber and exhaust of said second chamber.

43. The control system of claims 40 or 41 further comprising means for pressurizing said second chamber and exhausting said first chamber when the low speed ratio is selected.

44. The control system of claim 42 further comprising means for pressurizing said second chamber and exhausting said first chamber when said low-speed ratio is selected.

45. The control system of claims 40 or 41 further comprising:

means for pressurizing said second chamber and exhausting said first chamber when said low-speed ratio is selected and said friction coupling has been in the disengaged position after the selection of the low-speed ratio.

46. The system of claims 40 or 41 wherein said fluid is compressed air.

47. The system of claim 42 wherein said fluid is compressed air.

48. The system of claims 40 or 41 wherein said auxiliary section is a splitter section.

49. The system of claims 40 or 41 wherein of said first surface area ($a_{224}$) is less than twice as large as said second surface area ($a_{222}$).

50. The system of claim 42 wherein said first surface area ($a_{224}$) is less than twice as large as said second surface area ($a_{222}$).

51. A system (300) for controlling a pressurized fluid operated shift actuator (220) for an auxiliary transmission section (14) of a compound vehicular transmission (10) including a main transmission section (12) connected in series with said auxiliary transmission section, said transmission connected to a vehicular prime mover through a manually operated selectively engaged and disengaged friction master clutch, said auxiliary transmission section including a selectable high speed ratio and a selectable low speed ratio, each of said auxiliary section ratios engageable by a synchronized jaw clutch assembly (92/128), switch means for selecting a desired auxiliary section ratio, said actuator (220) comprising a differential area piston (221) having a first piston surface (224) defining a first chamber (224A) and a second piston surface (222) defining a second chamber (222A), said first piston surface of an area being larger than the area of said second piston surface, pressurization of said first chamber (224A) causing said actuator to urge said synchronized clutch assembly to engage said high speed ratio and pressurization of said second chamber (222A) causing said actuator to urge said synchronized clutch assembly to engage said low speed ratio, each of said chambers selectively connectable to a common source (234) of pressurized fluid and to an exhaust (EX), said system comprising:

means for sensing the current engaged or disengaged position of said master clutch;

means for responding to sensing (i) a selection of a shift into auxiliary section high speed ratio and (ii) said master clutch in the disengaged position by pressurizing said first chamber and exhausting said second chamber; and means for thereafter responding to (i) continuing selection of a shift into auxiliary section high speed ratio and (ii) said master clutch in the engaged position by pressurizing both said first and said second chambers.

52. The system of claim 50 further comprising:

means for responding to sensing (i) a selection of a shift into the auxiliary section low-speed ratio and (ii) said master clutch in the disengaged condition by pressurizing said second chamber and exhausting said first chamber; and means for thereafter, responding to a continuing selection of a shift into the auxiliary section low-speed ratio by pressurizing said second chamber and exhausting said first chamber regardless of the position of the master clutch.

53. The system of claims 51 or 52 wherein said auxiliary section (14/102) is a two-speed splitter section.

54. The system of claims 51 or 52 further comprising means for prohibiting initiation of a selected auxiliary section shift until master clutch disengaged position is sensed.

55. A valve assembly (310) for use in a control system (300) for controlling a pressurized fluid operated shift actuator (220) for an auxiliary transmission section (14) of a compound vehicular transmission (10) including a main transmission section (12) connected in series with said auxiliary transmission section, said transmission connected to a vehicular prime mover (E) through a selectively engaged and disengaged friction coupling, said auxiliary transmission section including a selectable high speed ratio and a selectable low speed ratio, each of said ratios engageable by a synchronized jaw clutch assembly (92/136), said actuator (220) comprising a differential area piston (221) having a first piston surface (224) defining a first chamber (224A) and a second piston surface (222) defining a second chamber (222A), said first piston surface area being larger than an area ($a_{222}$) defined by said second piston surface, pressurization of said first chamber (224A) causing said actuator to urge said synchronized clutch assembly to engage said high-speed ratio and pressurization of said second chamber (222A) causing said actuator to urge said synchronized clutch assembly to engage said low-speed ratio said system including means for indicating the current engaged or disengaged condition of said friction coupling, switch means (98) for selecting a desired auxiliary section ratio, a common source (234) of pressurized fluid and an exhaust (EX), said valve assembly including a three-position valve (312) having a first position (324) for pressurizing said first chamber and exhausting said second chamber, a second position (326) for pressurizing said second chamber and exhausting said first chamber and a third position (328) for pressurizing both said first and second chamber, said valve constantly (330) biased to said first position and includes pilot means responsive to said selector to move said valve from said first to said second position thereof and override means (332) cooperative with said means for indicating the current engaged or disengaged condition of said friction coupling for urging said valve from the first to the third position thereof when said friction coupling is in the engaged condition thereof.

* * * * *